(12) United States Patent
Kim

(10) Patent No.: US 10,657,850 B2
(45) Date of Patent: May 19, 2020

(54) FOLDABLE DISPLAY DEVICE

(71) Applicant: Samsung Display Co., Ltd., Yongin-si, Gyeonggi-do (KR)

(72) Inventor: Se Bong Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/274,012

(22) Filed: Feb. 12, 2019

(65) Prior Publication Data

US 2019/0251876 A1 Aug. 15, 2019

(30) Foreign Application Priority Data

Feb. 13, 2018 (KR) .................. 10-2018-0017767

(51) Int. Cl.
  *G02F 1/1333* (2006.01)
  *G09F 9/30* (2006.01)
  *G06F 1/16* (2006.01)
(52) U.S. Cl.
  CPC ............ *G09F 9/301* (2013.01); *G06F 1/1652* (2013.01)
(58) Field of Classification Search
  CPC .................................................. G02F 1/133305
  See application file for complete search history.

(56) References Cited

U.S. PATENT DOCUMENTS

| 9,698,375 B2 | 7/2017 | Prushinskiy et al. |
| 2017/0061836 A1* | 3/2017 | Kim ...................... G09F 9/301 |
| 2017/0200915 A1 | 7/2017 | Lee et al. |
| 2017/0244065 A1 | 8/2017 | Kim et al. |

FOREIGN PATENT DOCUMENTS

| KR | 10-2015-0020895 A | 2/2015 |
| KR | 10-2015-0062237 A | 6/2015 |
| KR | 10-2017-0009833 A | 1/2017 |
| KR | 10-2017-0106590 A | 9/2017 |
| WO | 2015178391 A1 | 11/2015 |

* cited by examiner

*Primary Examiner* — James A Dudek
(74) *Attorney, Agent, or Firm* — Innovation Counsel LLP

(57) ABSTRACT

A foldable display according to an exemplary embodiment of the present invention includes: a display panel that includes a display area, a non-display area, and a folding area; and a support member that is disposed below the display panel, wherein the support member includes a first stress relief portion and second stress relief portions that do not overlap with each other, the first stress relief portion is disposed on a first surface of the support member, the first surface facing the display panel, and the second stress relief portions are disposed on a second surface of the support member, the second surface opposite the first surface.

15 Claims, 8 Drawing Sheets

FOLDABLE DISPLAY DEVICE

CROSS-REFERENCE TO RELATED APPLICATION

This application claims priority to and the benefit of Korean Patent Application No. 10-2018-0017767 filed in the Korean Intellectual Property Office on Feb. 13, 2018, the entire contents of which are incorporated herein by reference.

BACKGROUND

(a) Technical Field

The present invention relates to a foldable display device.

(b) Description of the Related Art

A display device that displays an image is manufactured by forming a plurality of layers and a plurality of elements on a substrate. Glass has been used as the substrate of the display device. However, the glass substrate is heavy and easily broken. In addition, since the glass substrate is rigid, the display device cannot be easily deformed. Recently, a flexible display device that uses a flexible substrate that is light, strong against an impact, and deformable has been researched and developed.

The flexible display may be classified as a foldable display, a rabble display, or a stretchable display depending on its usage or shape. Among these, a display panel of the foldable display may be provided where an image is formed can be folded and unfolded like a book cover. When the display device is iteratively folded and unfolded, a folded portion of the display panel may be deformed.

The above information disclosed in this Background section is only for enhancement of understanding of the background of the invention and therefore it may contain information that does not form the prior art that is already known in this country to a person of ordinary skill in the art.

SUMMARY

Exemplary embodiments have been made in an effort to provide a foldable display that can prevent occurrence of defects resulting from folding of the foldable display.

A foldable display according to an exemplary embodiment of the present invention includes: a display panel that includes a display area, a non-display area, and a folding area; and a support member that is disposed below the display panel, wherein the support member includes a first stress relief portion and second stress relief portions that do not overlap with each other, the first stress relief portion is disposed on a first surface of the support member, the first surface facing the display panel, and the second stress relief portions are disposed on a second surface of the support member, the second surface opposite the first surface.

The non-display area may be disposed outside the display area, and the folding area may be disposed in the display area and the non-display area.

The display panel and the support member may be in an out-folding state or an in-folding state by being folded in the folding area.

The first stress relief portion may be disposed at a center portion of the folding area.

The second stress relief portions may be disposed at edges of the folding area.

The first stress relief portion may include a plurality of first stress relief patterns, and each of the plurality of first stress relief patterns may be formed as an engraved pattern on the first surface of the support member.

The second stress relief portions may include a plurality of second stress relief patterns, and each of the second stress relief patterns may be formed as an engraved pattern on the second surface of the support member.

The first stress relief patterns and the second stress relief patterns may have trapezoidal-shaped cross-sections.

The support member may include a light blocking member.

The foldable display according to the exemplary embodiment of the present invention may further include: a protective film that is disposed on the display panel; and a buffer member that is disposed below the support member.

The protective film and the buffer member may become in the in-folding state or in the out-folding state by being folded in the folding area.

According to the exemplary embodiments, the first stress relief portion and the second stress relief portions that do not overlap with each other are respectively disposed on the first surface and the second surface of the support member to thereby prevent occurrence of defects due to stress generated from folding of the display into the first folding state and the second folding state.

DETAILED DESCRIPTION OF THE EMBODIMENTS

Figure 1:
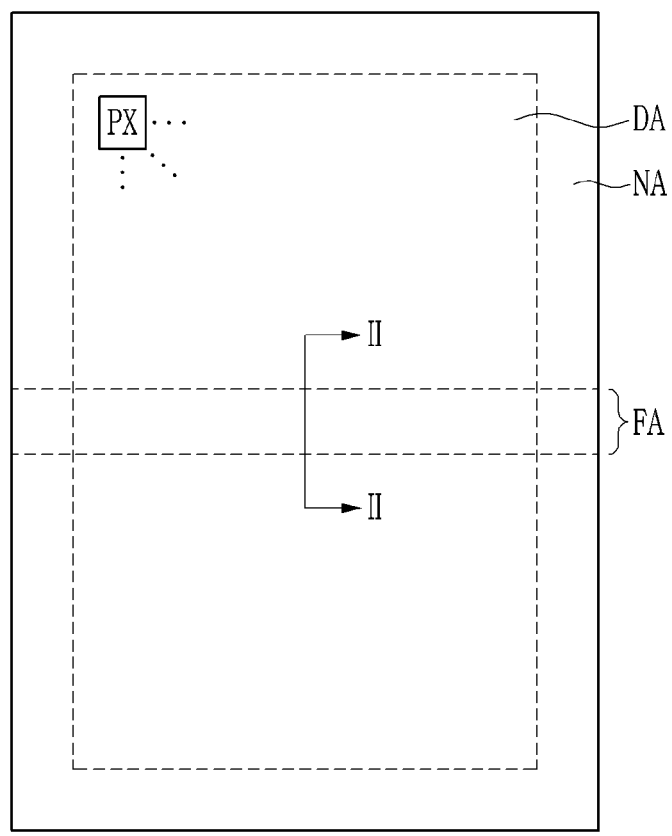
FIG. 1 is a schematic top plan view of a display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, size and thickness of each element are arbitrarily represented for better understanding and ease of description, but the present invention is not limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

Figure 2:
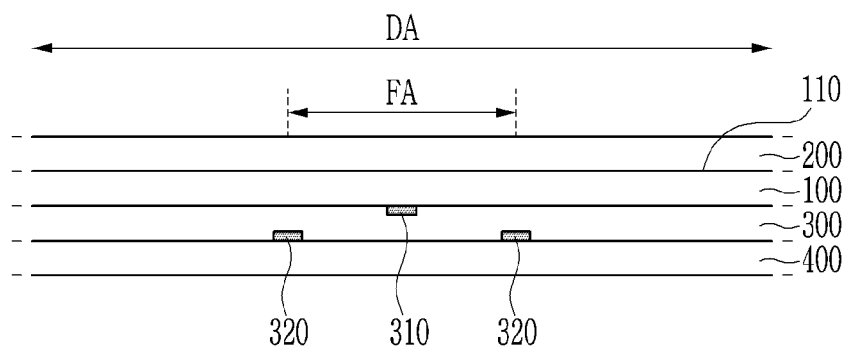
FIG. 2 schematically illustrates a cross-section of the display of FIG. 1, taken along the line II-II.
Figure 3:
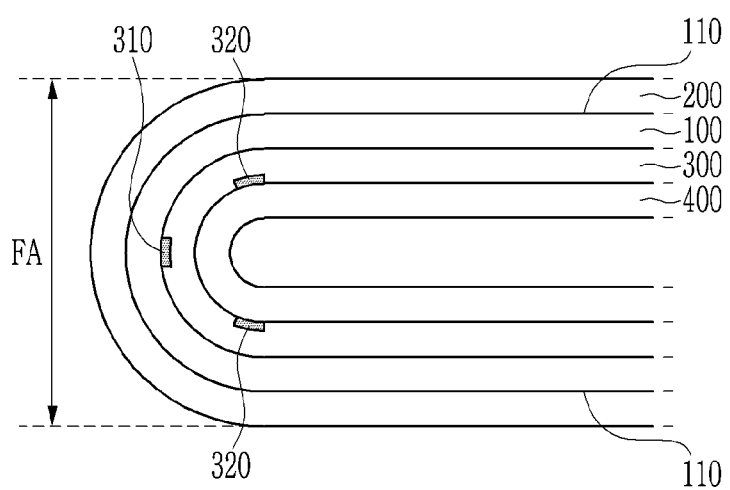
FIG. 3 schematically illustrates a first folding state of the display of FIG. 1.
Figure 4:
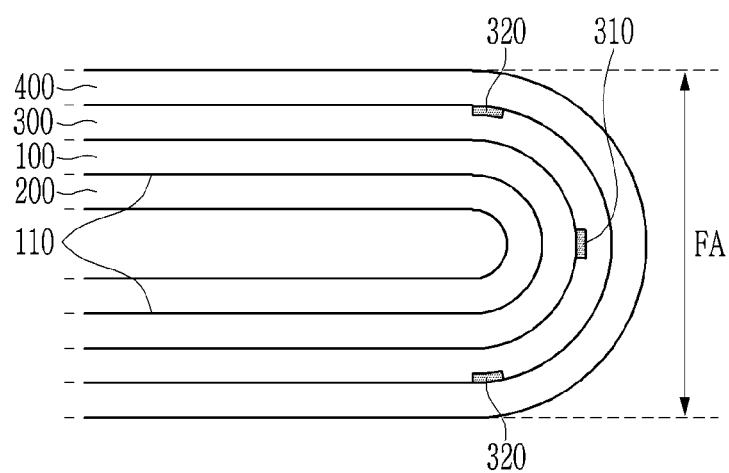
FIG. 4 schematically illustrates a second folding state of the display of FIG. 1.

FIG. 1 is a schematic top plan view of a display device in an opened state according to an exemplary embodiment of the present invention. FIG. 2 is a schematic exemplary cross-sectional view of FIG. 1, taken along the line II-II. FIG. 3 is a schematic view of the display device FIG. 1 in a first folding state. FIG. 4 is a schematic view of the display device of FIG. 1 in a second folding state.

Referring to FIG. 1 to FIG. 4, a display device 1000 according to the present exemplary embodiment includes a display area DA where an image is displayed, and a non-display area NA where elements and/or wires that generate and/or transmit various signals applied to the display area DA are disposed. In addition, the display device 1000 according to the present exemplary embodiment includes a folding area FA. The non-display area NA may be disposed outside the display area DA, or the folding area FA may be disposed in the display area DA and the non-display area NA.

The display device 1000 according to the present exemplary embodiment may be wholly opened to be flat as shown in FIG. 1 and FIG. 2. In addition, the display device 1000 according to the present exemplary embodiment may be folded as shown in FIG. 3 and FIG. 4. The folding of the display device 1000 may be carried out in the folding area FA. As shown in FIG. 3, when the display device 1000 is folded, lateral sides of a screen 110 of a display panel 100 may face away from each other in an area excluding the folding area FA. Such folding is referred to as an out-folding state or a first folding state. In addition, as shown in FIG. 4, the display panel 100 may be folded in such a way that the lateral ends of the screen 110 face each other in the area excluding the folding area FA. Such folding is called an in-folding state or a second folding state. Here, the screen 110 of the display panel 100 is a side where an image is displayed. The display device 1000 may be in the open state and in the out-folding state as the first folding state when being used by a user, and may be in the in-folding state as the second state when not being used by the user.

The display panel 100 includes the screen 110 where an image is displayed. The display panel 100 is a flexible panel that can be folded in the folding area FA. The display panel 100 may include a touch sensor layer that is provided in the form of a touch film, a touch sheet, a touch pad, and the like and senses a touch operation.

A protective film 200 is disposed on the display panel 100. The protective film 200 supports and protects the display panel 100 from permeation of foreign substances from the outside as well as external shocks. The protective film 200 is disposed on the screen 110, and has transmittance to such an extent that an image displayed on the display panel 100 can be transmitted well. The protective film 200 may include a flexible material that can be folded in the folding area FA.

A support member 300 is disposed below the display panel 100. The support member 300 protects the display panel 100 during a manufacturing process of the display panel 100. The support member 300 may include a flexible material that can be folded in the folding area FA. In addition, the support member 300 may include a light blocking material that can block light.

A buffer member 400 is disposed below the support member 300. When an external impact is applied to the display panel 100, the buffer member 400 protects the display panel 100 by buffering the external impact. The buffer member 400 may include a material that can absorb impact by containing air, such as a cushion or a sponge.

A circuit portion such as a printed circuit board may be disposed below the buffer member 400 to receive an external image signal, and transmits the external image signal to the display panel 100. In this case, light may be reflected due to wires of the circuit portion and thus viewing of the display may be affected, but since the support member 300 includes the light blocking material, reflection of light due to the wires can be prevented.

In the present exemplary embodiment, the support member 300 includes the light blocking member, but this is not restrictive. A coating layer formed of a light blocking material may be disposed on an upper surface or a lower surface of the support member 300. Here, the upper surface of the support member 300 faces the display panel 100, and the lower surface of the support member 300 is opposite to the upper surface of the support member 300 and faces the buffer member 400 of the display device 1000.

The support member 300 includes a first stress relief portion 310 and a second stress relief portion 320 disposed in the folding area FA. The first stress relief portion 310 is disposed on the upper surface of the support member 300, and the second stress relief portion 320 is disposed on the lower surface of the support member 300. The first stress relief portion 310 and the second stress relief portion 320 do not overlap each other. The first stress relief portion 310 is disposed at a center of the folding area FA, and second stress relief portions 320 are disposed at opposite edges of the folding area FA.

Figure 6:
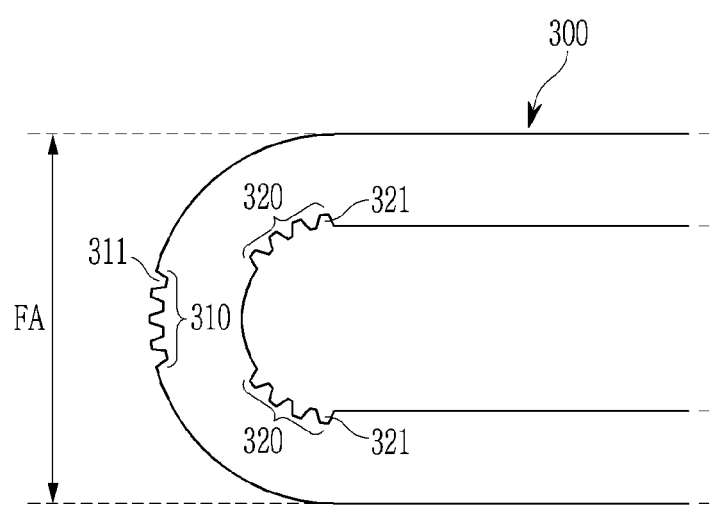
FIG. 6 schematically illustrates the first folding state of the support member of FIG. 5.
Figure 7:
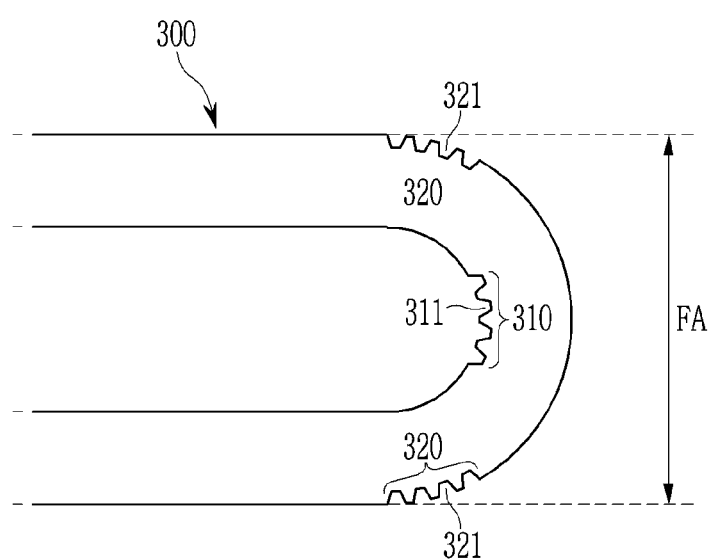
FIG. 7 schematically illustrates the second folding state of the support member of FIG. 5.

Next, referring to FIG. 5 to FIG. 7, the support member according to the present exemplary embodiment will be described.

Figure 5:
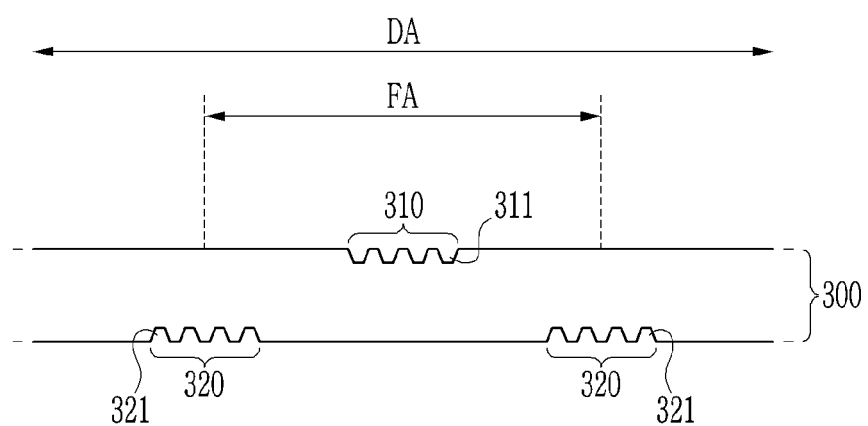
FIG. 5 schematically illustrates a cross-section of the support member according to the exemplary embodiment of the present invention.

FIG. 5 schematically shows a cross-sectional view of the support member according to the exemplary embodiment of the present invention. FIG. 6 schematically shows a first folding state of the support member of FIG. 5. FIG. 7 schematically shows a second folding state of the support member of FIG. 5.

The support member 300 includes the first stress relief portion 310 and the second stress relief portions 320 disposed in the folding area FA. The first stress relief portion 310 is disposed on the upper surface of the support member 300, and includes a plurality of first stress relief patterns 311. The first stress relief patterns 311 are formed as engraved patterns on the upper surface of the support member 300, and a cross-section of each first stress relief pattern 311 may have a trapezoidal shape. Each of the second stress relief portions 320 is disposed on the lower surface of the support member 300, and includes a plurality of second stress relief patterns 321. The second stress relief patterns 321 are formed as engraved patterns on the lower surface of the support member 300, and a cross-section of each second stress relief pattern 321 may have a trapezoidal shape.

The first stress relief portion 310 is disposed at a center of the folding area FA, and the second stress relief portions 320 are respectively disposed at opposite edges of the folding area FA. That is, the first stress relief portion 310 and the second stress relief portions 320 do not overlap each other.

As previously described, the display device 1000 according to the present exemplary embodiment may be in the first folding state or the second folding state by being folded in the folding area FA.

In the first folding state (refer to FIG. 3 and FIG. 6), a tensile stress is generated in the upper surface of the support member 300, and the tensile stress becomes a maximum at the center portion of the folding area FA. In the present exemplary embodiment, the first stress relief portion 310 is disposed at the center portion of the folding area FA on the upper surface of the support member 300 to relax the tensile stress in the first folding state. Since the first stress relief portion 310 includes the plurality of first stress relief patterns 311 and the cross-section of each of the plurality of first stress relief patterns 311 is formed in the shape of a trapezoid, variation due to the tensile stress in the first folding state can be minimized.

In the second folding state (refer to FIG. 4 and FIG. 7), tensile stress is generated in the lower surface of the support member 300, and the tensile stress becomes a maximum at the opposite edges of the folding area FA. In the present exemplary embodiment, the second stress relief portions 320 are respectively disposed at the opposite edges of the folding area FA on the lower surface of the support member 300 to relax the tensile stress in the second folding state. Since the second stress relief portion 320 includes the plurality of second stress relief patterns 321 and the cross-section of each of the plurality of second stress relief patterns 321 is formed in the shape of a trapezoid, variation due to the tensile stress in the second folding state can be minimized.

In addition, in the first folding state, compression stress is generated in the lower surface of the support member 300, and variation due to the compression stress in the first folding state can be minimized because the cross-section of each of the plurality of second stress relief patterns 321 is formed in the shape of a trapezoid. Further, in the second folding state, compression stress is generated in the upper surface of the support member 300, and variation due to the compression stress in the second folding state can be minimized because the cross-section of each of the plurality of first stress relief patterns 311 is formed in the shape of a trapezoid.

The display device 1000 according to the present exemplary embodiment is folded in the folding area FA and thus the first folding state and the second folding state may be repeatedly applied, and in this case, defects such as cracks and buckling may occur in an area where the tensile stress is generated. Thus, the first stress relief portion 310 is disposed at the center portion of the folding area FA in the upper surface of the support member 300, and the second stress relief portions 320 are respectively disposed at the opposite edges of the folding area FA in the lower surface of the support member 300 to thereby prevent generation of the defects that are generated due to bidirectional folding of the display device 1000.

Hereinafter, a layering structure of the display panel 100 according to the present exemplary embodiment will be described with reference to FIG. 8.

Figure 8:
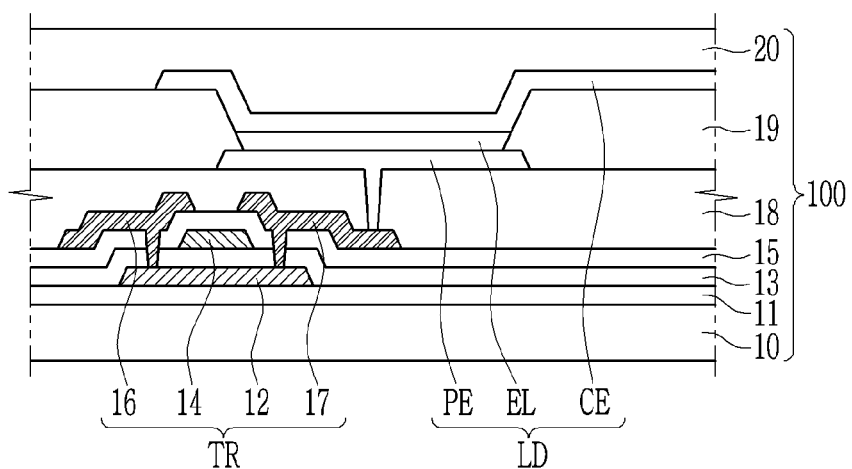
FIG. 8 is a cross-sectional view of a layering structure of the display panel according to the exemplary embodiment of the present invention.

FIG. 8 is a cross-sectional view of an example of a layering structure of the display panel according to the exemplary embodiment of the present invention. A cross-section shown in FIG. 8 may approximately correspond to one pixel area.

Referring to FIG. 8, the display panel 100 includes a substrate 10, a transistor TR disposed on the substrate 10, and a light emitting diode LD connected to the transistor TR.

The substrate 10 may be a flexible substrate including a flexible resin such as a polyimide, a polyamide, polyethylene terephthalate, and the like. The substrate 10 may include a barrier layer that prevents permeation of moisture, oxygen, and the like from the outside.

A buffer layer 11 is disposed on the substrate 10. The buffer layer 11 blocks an impurity that may spread to a semiconductor layer 12 from the substrate 10 during a process for forming the semiconductor layer 12, and reduces stress applied to the substrate 10.

The semiconductor layer 12 of the transistor TR is disposed on the buffer layer 11, and a gate insulation layer 13 is disposed on the semiconductor layer 12. The semiconductor layer 12 includes a source region and a drain region, and a channel region provided between the source region and the drain region. The semiconductor layer 12 may include a polysilicon, an oxide semiconductor, or amorphous silicon. The gate insulation layer 13 may include an inorganic insulation material such as a silicon oxide, a silicon nitride, and the like.

A gate conductor including a gate electrode 14 of the transistor TR is disposed on the gate insulation layer 13. The gate conductor may include, for example, a metal such as molybdenum (Mo), copper (Cu), aluminum (Al), silver (Ag), chromium (Cr), tantalum (Ta), and titanium (Ti), or a metal alloy thereof.

An interlayer insulation layer 15 is disposed on the gate conductor. The interlayer insulation layer 15 may include an inorganic insulating material.

A data conductor that includes a source electrode 16 and a drain electrode 17 of the transistor TR is disposed on the interlayer insulation layer 15. The source electrode 16 and drain electrode 17 are respectively connected to the source region and the drain region of the semiconductor layer 12 through contact holes formed in the interlayer insulation layer 15 and the gate insulation layer 13. The data conductor may include, for example, a metal such as aluminum (Al), copper (Cu), silver (Ag), molybdenum (Mo), chromium (Cr), gold (Au), platinum (Pt), palladium (Pd), tantalum (Ta), tungsten (W), titanium (Ti), nickel (Ni), and the like, or a metal alloy thereof.

A passivation layer 18 is disposed on the data conductor. The passivation layer 18 may include an organic insulating material.

A pixel electrode PE is disposed on the passivation layer 18. The pixel electrode PE is connected with the drain electrode 17 through a contact hole formed in the passivation layer 18, and receives a data signal that controls illumination of the light emitting diode LD.

A pixel defining layer 19 is disposed on the passivation layer 70 and the pixel electrode PE. The pixel defining layer 19 has an opening that overlaps the pixel electrode PE. An emission layer EL is disposed in the opening of the pixel defining layer 19 over the pixel electrode PE, and a common electrode CE is disposed on the emission layer EL. The pixel electrode PE, the emission layer EL, and the common electrode CE form the light emitting diode LD. The pixel electrode PE may be an anode of the light emitting diode LD, and the common electrode CE may be a cathode of the light emitting diode LD. The common electrode CE may include a transparent conductive material such as indium tin oxide (ITO), indium zinc oxide (IZO), and the like.

A thin film encapsulation layer 20 that protects the light emitting diode LD is disposed on the common electrode CE.

A touch sensor layer (not shown) is disposed on the thin film encapsulation layer 20. The touch sensor layer may include touch electrodes formed of a transparent conductive material such as ITO, IZO, and the like, or a metal mesh, and the touch electrodes may be formed as a single layer or a multi-layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A foldable display comprising:
    a display panel comprising a display area, a non-display area, and a folding area; and
    a support member disposed below the display panel and comprising first stress relief portion and second stress relief portions that do not overlap with each other,
    wherein the support member has a first surface facing the display panel and a second surface opposite the first surface,
    the first stress relief portion is disposed at a center portion of the folding area of the first surface of the support member, and
    the second stress relief portions are disposed at edges of the folding area of the second surface of the support member.

2. The foldable display of claim 1, wherein the non-display area is disposed outside the display area, and the folding area is disposed in the display area and the non-display area.

3. The foldable display of claim 1, wherein the display panel and the support member are in an out-folding state or an in-folding state by being folded in the folding area.

4. The folding display of claim 1, wherein the first stress relief portion comprises a plurality of first stress relief patterns, and each of the plurality of first stress relief patterns is formed as an engraved pattern on the first surface of the support member.

5. The folding display of claim 4, wherein the second stress relief portions comprise a plurality of second stress relief patterns, and each of the second stress relief patterns is formed as an engraved pattern on the second surface of the support member.

6. The folding display of claim 5, wherein the first stress relief patterns and the second stress relief patterns have trapezoidal-shaped cross-sections.

7. The folding display of claim 6, wherein the support member comprises a light blocking member.

8. The folding display of claim 3, further comprising:
    a protective film disposed on the display panel; and
    a buffer member disposed below the support member.

9. The display device of claim 8, wherein the protective film and the buffer member are in the in-folding state or in the out-folding state by being folded in the folding area.

10. A foldable display being folded into an out-folding state or an in-folding state, comprising
    a display panel comprising a display area, a non-display area, and a folding area;
    a protective film disposed on the display panel;
    a support member disposed below the display panel and comprising first stress relief portion and second stress relief portions that do not overlap with each other, and
    a buffer member disposed below the support member,
    wherein the support member has a first surface facing the display panel and a second surface opposite the first surface,
    the first stress relief portion is disposed on at a center portion of the folding area of the first surface of the support member, and
    the second stress relief portions are disposed at edges of the folding area of the second surface of the support member.

11. The foldable display of claim 10, wherein the display panel, the protective film, the support member, and the buffer member are in the out-folding state or the in-folding state by being folded in the folding area.

12. The foldable display of claim 10, wherein the first stress relief portion comprises a plurality of first stress relief patterns, and each of the plurality of first stress relief patterns is formed as an engraved pattern on the first surface of the support member.

13. The foldable display of claim 12, wherein each of the second stress relief portions comprises a plurality second stress relief patterns, and each of the second stress relief patterns is formed as an engraved pattern on the second surface of the support member.

14. The foldable display of claim 13, wherein the first stress relief patterns and the second stress relief patterns have trapezoidal-shaped cross-sections.

15. The foldable display of claim 14, wherein the support member comprises a light blocking material.

* * * * *